(12) United States Patent
Shirano

(10) Patent No.: US 10,740,199 B2
(45) Date of Patent: Aug. 11, 2020

(54) CONTROLLING DEVICE, CONTROLLING METHOD, AND FAULT TOLERANT APPARATUS

(71) Applicant: NEC Corporation, Minato-ku, Tokyo (JP)

(72) Inventor: Yasuyuki Shirano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 273 days.

(21) Appl. No.: 15/912,860

(22) Filed: Mar. 6, 2018

(65) Prior Publication Data

US 2018/0276088 A1   Sep. 27, 2018

(30) Foreign Application Priority Data

Mar. 22, 2017   (JP) .................................. 2017-056113

(51) Int. Cl.
*G06F 11/20* (2006.01)
*G06F 13/40* (2006.01)

(52) U.S. Cl.
CPC ...... *G06F 11/2007* (2013.01); *G06F 13/4022* (2013.01); *G06F 2201/805* (2013.01)

(58) Field of Classification Search
CPC ............. G06F 11/2002–2007; G06F 13/4022
USPC ................................................. 714/10–13, 43
See application file for complete search history.

(56) References Cited

U.S. PATENT DOCUMENTS 7,664,921 B2 * 2/2010 Okawa ................ G06F 11/1666
711/148
8,930,752 B2 * 1/2015 Gara .................... G06F 11/1641
714/11
8,959,392 B2 * 2/2015 Traskov ................ G06F 11/165
714/10
2001/0032301 A1   10/2001 Morita et al.
2016/0041935 A1 * 2/2016 Kinjo .................. G06F 13/4022
710/116

FOREIGN PATENT DOCUMENTS

| JP | H07-182189 A | 7/1995 |
| JP | H09-128354 A | 5/1997 |
| JP | 2008-210183 A | 9/2008 |

OTHER PUBLICATIONS

Japanese Office Action for JP Application No. 2017-056113 dated Mar. 13, 2018 with English Translation.

* cited by examiner

*Primary Examiner* — Joseph R Kudirka

(57) ABSTRACT

A controlling device includes a controller that executes control to functionally activate of, at least, a part of transmission lanes in multiple transmission lanes connecting a plurality of subsystems which run based on a lock-step method and an embedder that executes an embedding operation to realize a multiplexing state using the part of transmission lanes controlled to functionally activate by the controller and the plurality of subsystems, wherein, the controller determines whether or not the embedding operation succeeds, determines, when the embedding operation fails, whether or not an embedding operation using another part of transmission lanes, of the multiple transmission lanes, different from the part of transmission lanes used in the failure embedding operation, and executes, when the corporation processing succeeds, control to functionally activate the another part of transmission lanes.

10 Claims, 15 Drawing Sheets

Fig.10

| ORDER | CONTROL INFORMATION |
|---|---|
| 1 | TRANSMISSION LANE A, TRANSMISSION LANE B |
| 2 | TRANSMISSION LANE A |
| 3 | TRANSMISSION LANE B |

Fig.11

| ORDER | CONTROL INFORMATION |
|---|---|
| 1 | TRANSMISSION LANE A, TRANSMISSION LANE B, TRANSMISSION LANE C, TRANSMISSION LANE D |
| 2 | TRANSMISSION LANE A, TRANSMISSION LANE B |
| 3 | TRANSMISSION LANE C, TRANSMISSION LANE D |

Fig.12

| ORDER | CONTROL INFORMATION |
|---|---|
| 1 | TRANSMISSION LANE A, TRANSMISSION LANE B, TRANSMISSION LANE C, TRANSMISSION LANE D |
| 2 | TRANSMISSION LANE A, TRANSMISSION LANE B |
| 3 | TRANSMISSION LANE C, TRANSMISSION LANE D |
| 4 | TRANSMISSION LANE A, TRANSMISSION LANE C |
| 5 | TRANSMISSION LANE A, TRANSMISSION LANE D |
| 6 | TRANSMISSION LANE B, TRANSMISSION LANE C |
| 7 | TRANSMISSION LANE B, TRANSMISSION LANE D |

CONTROLLING DEVICE, CONTROLLING METHOD, AND FAULT TOLERANT APPARATUS

This application is based upon and claims the benefit of priority from Japanese Patent Application No. 2017-056113, filed on Mar. 22, 2017, the disclosure of which is incorporated herein in its entirety by reference.

TECHNICAL FIELD

The present invention is relates to a controlling device controlling transmission lanes in, for example, a fault tolerant apparatus.

BACKGROUND ART

It is difficult to specify whether a fault factor occurred in transmission lanes is a module in a transmitting side or a module in a receiving side, when the fault occurs in the transmission lanes connecting the two modules in the lock-step fault tolerant apparatus. In specifying the factor of the fault in a fault tolerant apparatus, a CPU subsystem or an I/O subsystem in the two modules of the fault tolerant apparatus is functionally separated from the fault tolerant apparatus in accordance with a predetermined condition. CPU is an abbreviation of "Central Processing Unit". I/O is an abbreviation of "Input/Output". A subsystem as a fault factor in transmission lanes are functionally separated and a module including the separated subsystem is replaced. As a result, the replaced module and another module can recover duplicate state in the fault tolerant apparatus.

PTL 1 discloses an example of a fault tolerant apparatus.

The fault tolerant apparatus disclosed in PTL 1 includes three system buses and six processors. Each system bus is connected with two processors. In the fault tolerant apparatus, three-multiplexing state, at most, is realized by using processors connecting with each other via the system buses.

CITATION LIST

Patent Literature

PTL 1: Japanese Laid-open Patent Publication No. H07 (1995)-182189

SUMMARY OF INVENTION

Technical Problem

When a subsystem that is not a fault factor occurred in transmission lanes is functionally separated from a fault tolerant apparatus, a module including the separated subsystem is replaced. However, this cannot solve the fault. In this case, duplicated state cannot be realized in the fault tolerant apparatus as a fault occurs in transmission lanes, again. The solution of the fault is replacement of a module that is a factor of the fault in the transmission lanes after stopping the fault tolerant apparatus.

The fault tolerant apparatus disclosed in PTL 1 cannot solve the above-described fault occurred in transmission lanes as the fault tolerant apparatus has a different configuration from a fault tolerant apparatus described in the background art.

One of objects of the present invention is to provide a controlling device and the like that realize high availability for a fault tolerant apparatus.

SUMMARY

As an aspect of the present invention, a controlling device including:

a controller configured to execute control to functionally activate, at least, a part of transmission lanes in multiple transmission lanes connecting a plurality of subsystems which run based on a lock-step method; and an embedder configured to execute an embedding operation to realize a multiplexing state using the part of transmission lanes controlled to functionally activate by the controller and the plurality of the subsystems, wherein, the controller determines whether or not the embedding operation succeeds, determines, when the embedding operation fails, whether or not an embedding operation using another part of transmission lanes, of the multiple transmission lanes, different from the part of transmission lanes used in the failure embedding operation, and executes, when the corporation processing succeeds, control to functionally activate the another part of transmission lanes.

As an aspect of the present invention, a controlling method including:

by information processing apparatus, executing control to functionally activate of, at least, a part of transmission lanes in multiple transmission lanes connecting a plurality of subsystems which run based on a lock-step method; and executing an embedding operation to realize a multiplexing state using the part of transmission lanes controlled to functionally activate, wherein, determining whether or not the embedding operation succeeds, determining, when the embedding operation fails, whether or not an embedding operation using another part of transmission lanes, of the multiple transmission lanes, different from the part of transmission lanes used in the failure embedding operation, and executing, when the corporation processing succeeds, control to functionally activate the another part of transmission lanes.

The controlling device and the like according to the present invention can achieve high availability for a fault tolerant apparatus.

BRIEF DESCRIPTION OF THE DRAWINGS

Exemplary features and advantages of the present invention will become apparent from the following detailed description when taken with the accompanying drawings in which:

FIG. 10 is a figure conceptually illustrating an example of processing flows of realizing a duplicated state using two modules;

FIG. 11 is a figure conceptually illustrating an example of processing flows of realizing a duplicated state using two modules;

FIG. 12 is a figure conceptually illustrating an example of processing flows of realizing a duplicated state using two modules;

EXAMPLE EMBODIMENTS

Next, example embodiments of the present invention will be described in detail with reference to the drawings.

First Example Embodiment

Figure 1:
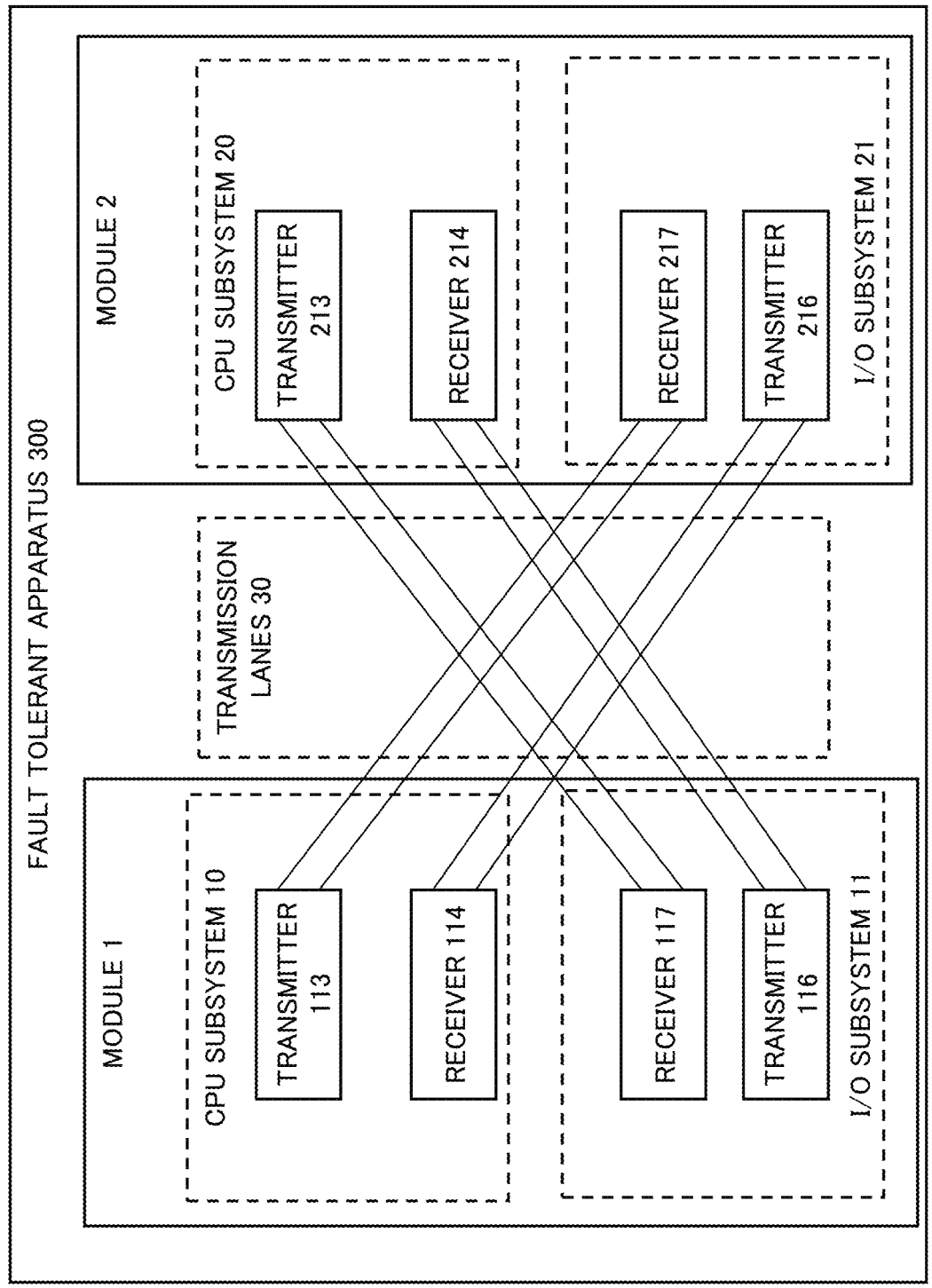
FIG. 1 is a block diagram roughly illustrating a functional configuration of a fault tolerant apparatus according to a first example embodiment of the present invention.

A configuration of a fault tolerant apparatus 300 according to a first example embodiment of the present invention will be described in detail with reference to FIG. 1. FIG. 1 is a block diagram roughly illustrating a functional configuration of the fault tolerant apparatus 300 according to the first example embodiment of the present invention.

The fault tolerant apparatus 300 according to the first example embodiment includes a module 1, a module 2, and transmission lines (lanes) 30. The transmission lanes 30 connect the module 1 and the module 2. The transmission lanes 30 include a plurality of transmission lanes.

The module 1 and the module 2 are physical information processing apparatus, respectively. The module 1 and the module 2 are, for example, units having mountable size (volume) to a rack-type case.

A configuration of the module 1 is conceptually categorized into a CPU subsystem 10 and an I/O subsystem 11. The CPU subsystem 10 includes a transmitter (a transmitting unit, a transmitting module, a transmitting block, a transmitting part) 113 and a receiver (a receiving unit, a receiving module, a receiving block, a receiving part) 114. The I/O subsystem 11 includes a transmitter 116 and a receiver 117.

The module 2 has a configuration similar to the module 1 in the fault tolerant apparatus 300 where two CPU subsystems run based on a lock-step method. Therefore, description about the configuration of the module 2 will be omitted.

In the configuration example shown in FIG. 1, two transmission lanes connect the transmitter 113 and a receiver 217 with each other. Similarly, two transmission lanes of the transmission lanes 30 also connect the receiver 114, the receiver 117, the transmitter 116, a transmitter 213, a receiver 214, and a transmitter 216 with each other, respectively. Number of transmission lanes connecting a transmitter and a receiver is not always two and may be more than two.

Figure 2:
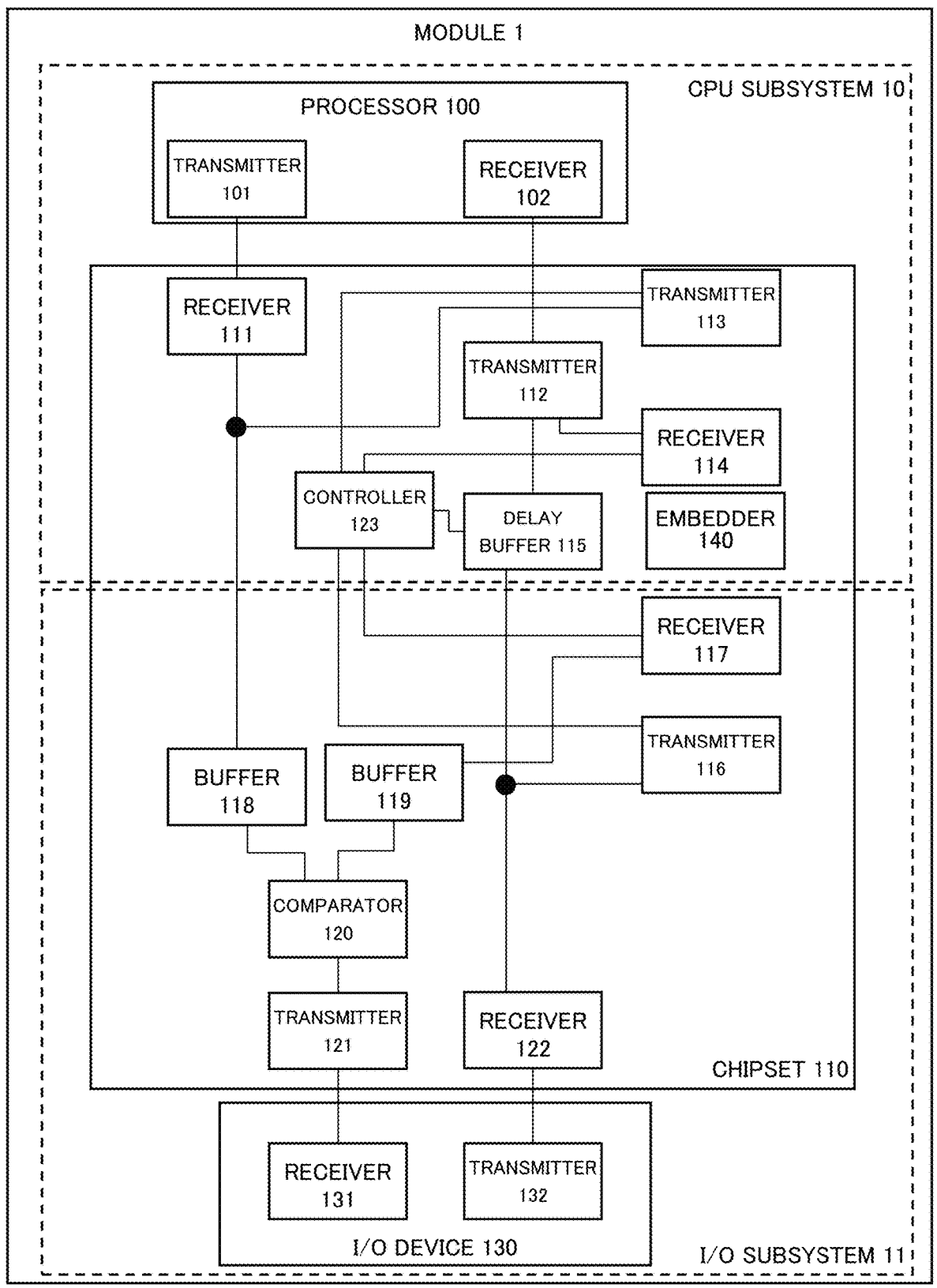
FIG. 2 is a block diagram illustrating a configuration of a module 1 according to the first example embodiment.

A configuration of the module 1 in the fault tolerant apparatus 300, which is conceptually illustrated in FIG. 1, will be described in detail with reference to FIG. 2. FIG. 2 is a block diagram illustrating a configuration of the module 1 according to the first example embodiment.

The module 1 includes a processor 100, a chipset 110, an I/O device 130. The processor 100 includes a transmitter 101 and a receiver 102. The I/O device 130 includes a receiver 131 and a transmitter 132. The chipset 110 includes a receiver 111, a transmitter 112, a transmitter 113, a receiver 114, a delay buffer 115, a transmitter 116, a receiver 117, a buffer 118, a buffer 119, a comparator (a comparing unit, a comparing module, a comparing block, a comparing part) 120, a transmitter 121, a receiver 122, a controller (a controlling unit, a controlling module, a controlling block, a controlling part) 123, and an embedder (an embedding unit, an embedding module, an embedding block, an embedding part) 140.

The processor 100 may be connected with a main memory device (memory) and the like. The I/O device 130 may be connected with an input-output apparatus such as a hard disc drive or the like.

The CPU subsystem 10 is a conceptual component including the processor 100, the receiver 111, the transmitter 112, the transmitter 113, the receiver 114, the delay buffer 115 and the controller 123. The I/O subsystem 11 is a conceptual component including the I/O device 130, the receiver 117, the buffer 118, the buffer 119, the comparator 120, the transmitter 121, and the receiver 122.

Figure 3:
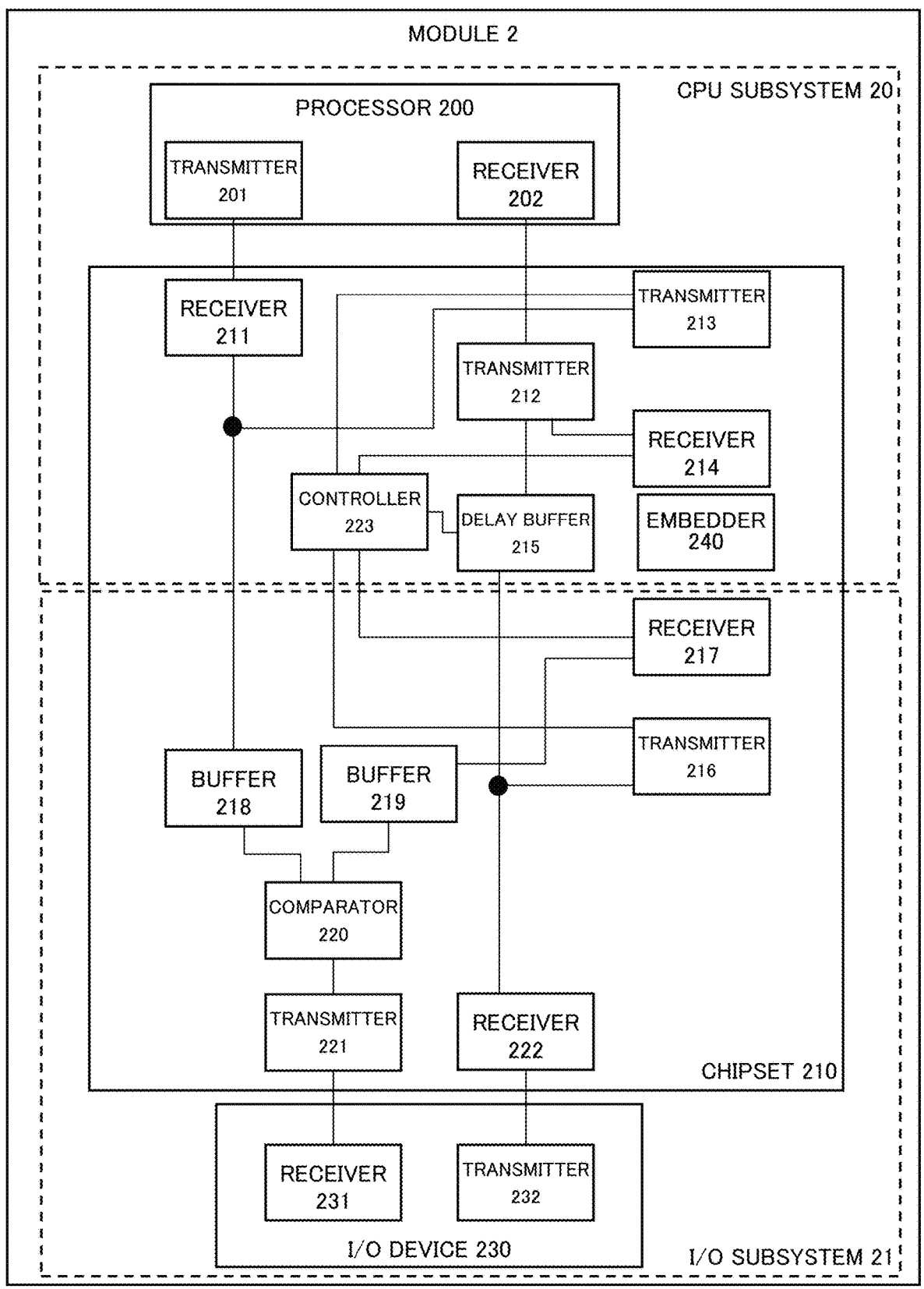
FIG. 3 is a block diagram illustrating a configuration of a module 2 according to the first example embodiment.

A physical configuration of the module 2 in the fault tolerant apparatus 300 having the above-described functional configuration roughly illustrated in FIG. 1 will be described in detail with reference to FIG. 3. FIG. 3 is a block diagram illustrating a configuration of the module 2 according to the first example embodiment. Reference signs assigned to components in FIG. 3 is different from reference signs assigned to corresponding components in FIG. 2 only in the first letter of each reference sign. The module 2 has a configuration similar to the module 1. The configuration of the module 2 will be omitted in detail.

An operation in individual component of the module 1 will be described in detail with reference to FIG. 2.

The processor 100, for example, generates a packet to the I/O device 130 and a packet to an I/O device 230 in the module 2 (FIG. 3). The chipset 110 relays the packets.

The transmitter 101 transmits the packet generated by the processor 100 to the chipset 110. The receiver 102 receives the packet transmitted by the chipset 110.

The I/O device 130 generates a packet to the processor 100 and a packet to a processor 200 in the module 2 (FIG. 3). The transmitter 132 transmits the packet generated by the I/O device 130 to the chipset 110. The receiver 131 in the I/O device 130 receives the packet transmitted by the chipset 110.

The chipset 110 relays the packet generated by the processor 100, the packet generated by the processor 200 in the module 2 (FIG. 3), the packet generated by the I/O device 130, and the packet generated by the I/O device 230 in the module 2 (FIG. 3)

The receiver 111 receives the packet transmitted by the transmitter 101 and reads a destination of the received packet. When the read destination is the I/O device 130, the receiver 111 stores the packet in the buffer 118. When the read destination is the I/O device 230, the receiver 111 inputs the packet to the transmitter 113. A transmitter 112 in the chipset 110 transmits a packet received by the receiver 114 or a packet stored in the delay buffer 115 to the processor 100.

The transmitter 113 transmits the packet received by the receiver 111 to the module 2 (for example, a chipset 210) via the transmission lanes 30. The transmitter 113 transmits a packet via the transmission lanes 30 by using a transmission-lane bandwidth directed by the controller 123.

The receiver 114 receives the packet transmitted by the chipset 210 (FIG. 3) in the module 2 via the transmission lanes 30 (FIG. 1) and inputs the received packet to the transmitter 112. The receiver 114 receives the packet via the transmission lanes 30 (FIG. 1) by using a transmission-lane bandwidth directed by the controller 123.

The transmitter 116 transmits the packet received by the transmitter 112 to the chipset 210 in the module 2 (FIG. 3) via the transmission lanes 30 (FIG. 1). The transmitter 116 receives the packet via the transmission lanes 30 by using a transmission-lane bandwidth directed by the controller 123. The receiver 117 receives the packet transmitted by the chipset 210 in the module 2 (FIG. 3) via the transmission lanes 30 (FIG. 3) and stores the received packet to the buffer 119. The receiver 117 receives a packet via the transmission lanes 30 (FIG. 1) by using a transmission-lane bandwidth directed by the controller 123.

The delay buffer 115 obtains the packet inputted by the receiver 122 and inputs the packet to the transmitter 112 after pass of a delay time directed by the controller 123.

The fault tolerant apparatus 300 according to the present example embodiment runs based on a lock-step method. In the fault tolerant apparatus 300, packet transmitted by the I/O device 130 in the I/O subsystem 11 and packet transmitted by the I/O device 230 in an I/O subsystem 21 (FIG. 3), respectively, arrive at the processor 100 in the CPU subsystem 10 and the processor 200 in a CPU subsystem 20 (FIG. 2) simultaneously or substantially simultaneously.

When the controller 123 (FIG. 2) and a controller 223 (FIG. 3) change a transmission-lane bandwidth of the transmission lanes 30, a latency in the transmission lanes 30 changes depending on the transmission-lane bandwidth. The controller 123 adjusts a delay time based on the transmission-lane bandwidth so as to arrive at the processor 100 and the processor 200 simultaneously or substantially simultaneously.

The comparator 120 determines whether or not a packet stored in the buffer 118 and a packet stored in the buffer 119 match. When these two packets match, the comparator 120 inputs the packet to the transmitter 121. Otherwise, processing for the packet is in failure.

The transmitter 121 transmits the packet inputted by the comparator 120 to the I/O device 130. The receiver 122 receives the packet transmitted by the transmitter 132 and transmits the received packet to the delay buffer 115 and the transmitter 116.

Recovery processing from a fail on the transmission lanes 30 in the fault tolerant apparatus 300 will be described.

For the convenience of explanation, it is assumed that a plurality of transmission lanes in the transmission lanes 30 shown in FIG. 1 are identified by the first transmission lane to the eighth transmission lane from the upper end of the connection of the module 1. It is assumed that upper transmission lanes is upper transmission lanes at the side of the module 1 in two transmission lanes connecting individual component. It is assumed that lower transmission lanes is lower transmission lanes at the side of the module 1 in two transmission lanes connecting individual component. Therefore, the upper transmission lanes includes the first transmission lane, the third transmission lane, the fifth transmission lane, and the seventh transmission lane. The lower transmission lanes includes the second transmission lane, the fourth transmission lane, the sixth transmission lane, and the eighth transmission lane.

For example, the sixth transmission lane is a lower transmission lane in transmission lanes connecting the receiver 117 and the transmitter 213. The fifth transmission lane is an upper transmission lane in transmission lanes connecting the receiver 117 and the transmitter 213. The first transmission lane is an upper transmission lane in transmission lanes connecting the transmitter 113 and the receiver 217.

Figure 4:
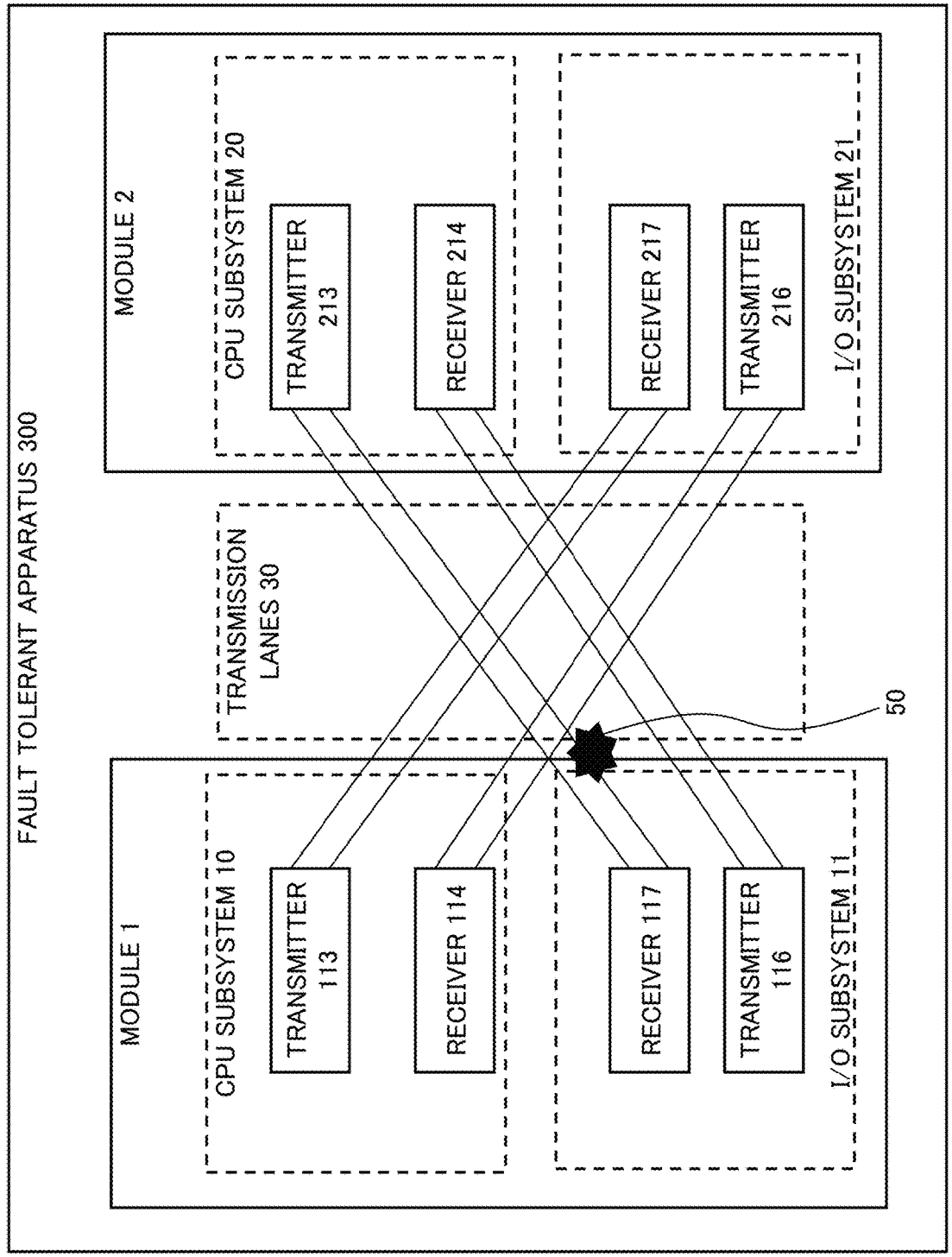
FIG. 4 is a figure illustrating an example of a fault happened at a sixth transmission lane.

Next, processing in the fault tolerant apparatus 300 according to the present example embodiment will be described with reference to example of a fault 50 happened at the sixth transmission lane as shown in FIG. 4. FIG. 4 is a figure illustrating an example of a fault 50 happened at the sixth transmission lane.

Figure 5:
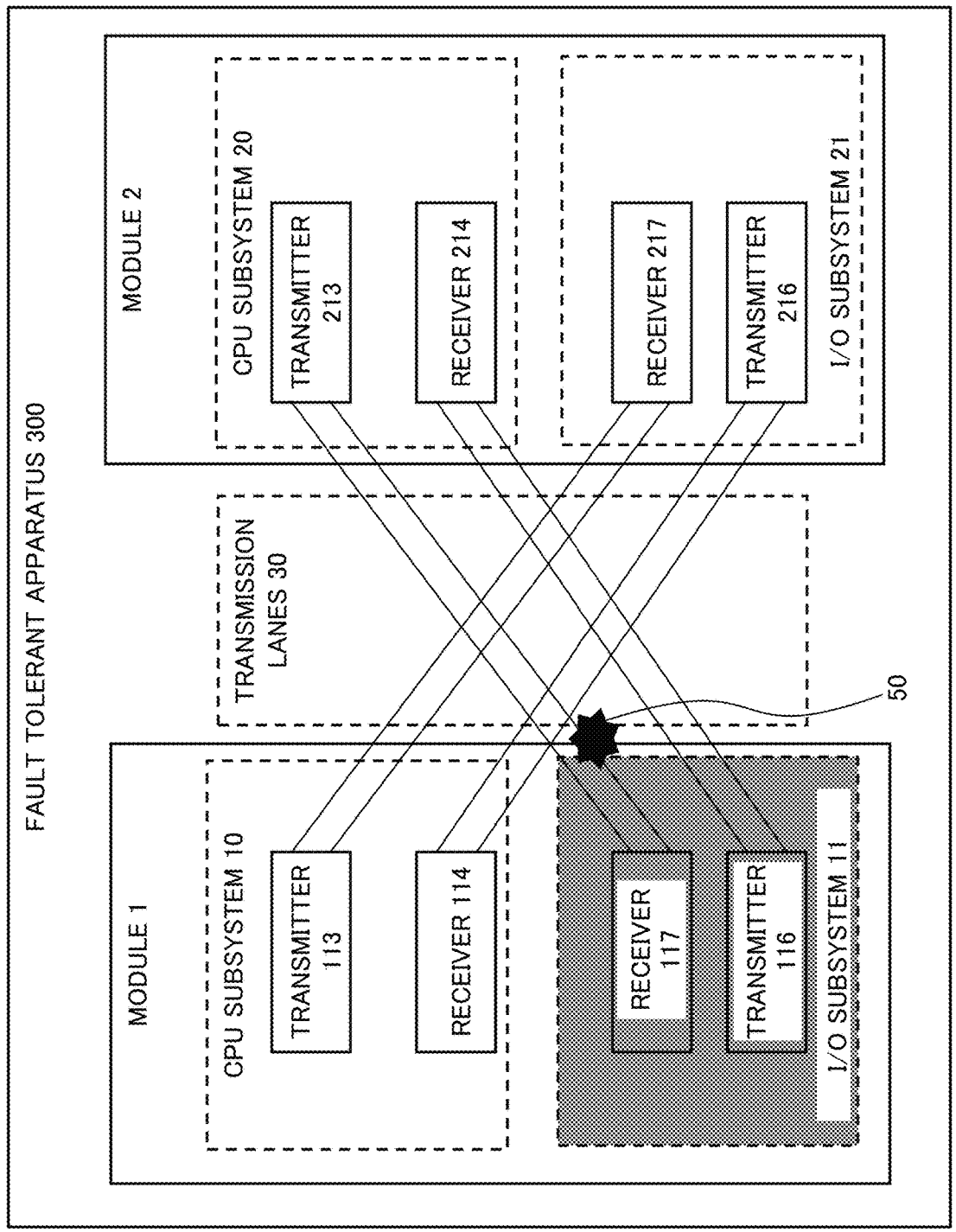
FIG. 5 is a figure conceptually illustrating a state where an I/O subsystem has been functionally separated from a fault tolerant apparatus.
Figure 6:
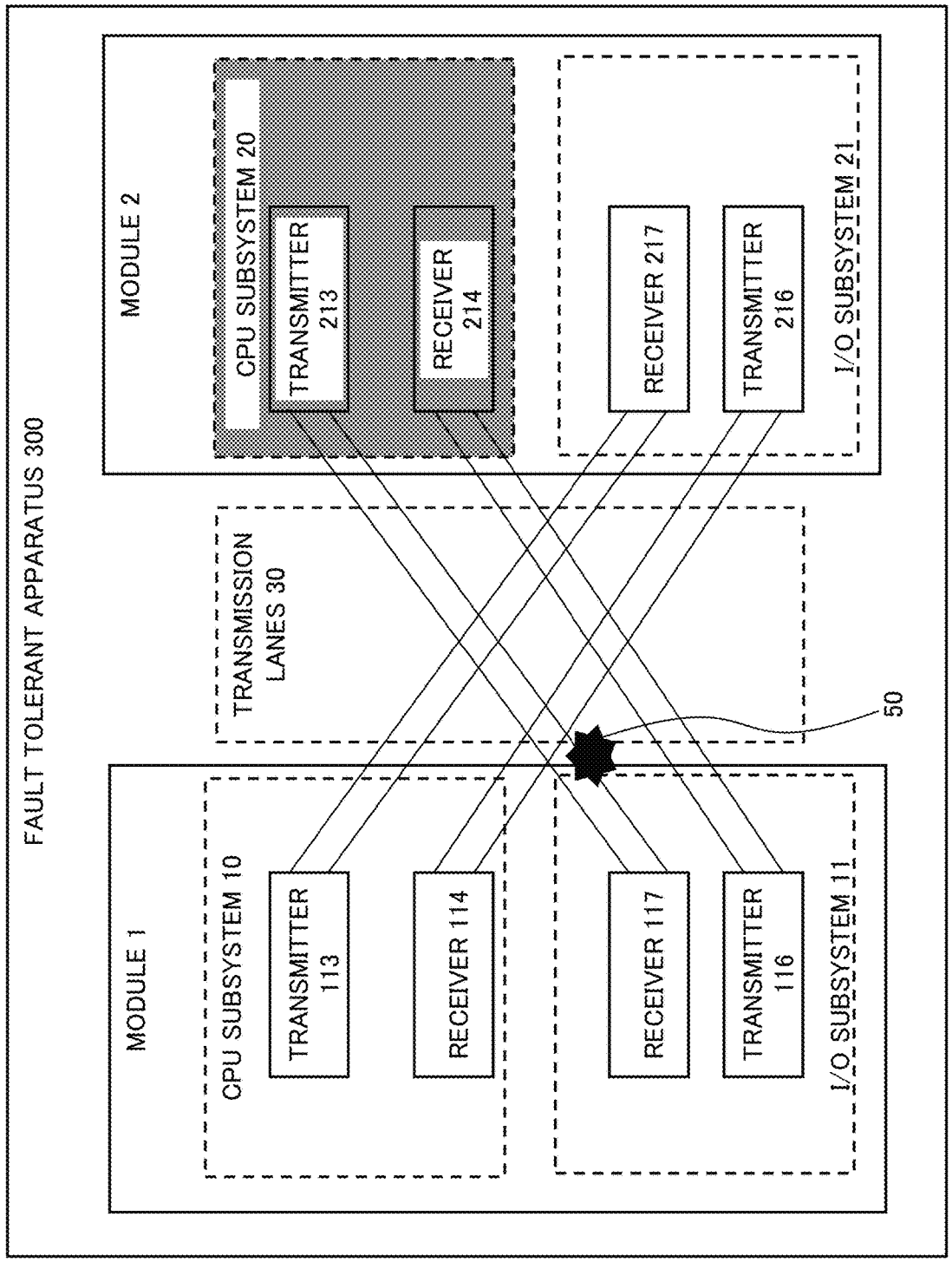
FIG. 6 is a figure conceptually illustrating a state where a CPU subsystem has been functionally separated from the fault tolerant apparatus.

If the fault 50 happens at the sixth transmission lane, the I/O subsystem 11 (FIG. 5) or the CPU subsystem 20 (FIG. 6) are functionally separated from the fault tolerant apparatus 300. FIG. 5 is a figure conceptually illustrating a state where the I/O subsystem 11 has been functionally separated from the fault tolerant apparatus 300. FIG. 6 is a figure conceptually illustrating a state where the CPU subsystem 20 has been functionally separated from the fault tolerant apparatus 300.

If a fail happens, at least, in a CPU subsystem or in an I/O subsystem in each the above-described module, at least either subsystem is functionally separated from a fault tolerant apparatus. Then, whole module including the sub-modules are exchanged to recovery of the fault tolerant apparatus. For example, user can know a fail occurrence by a lump (i.e. an alarm lamp (not depicted) for notifying the fail occurrence) setting on/in the module or by referring to log relating to the module.

Figure 7:
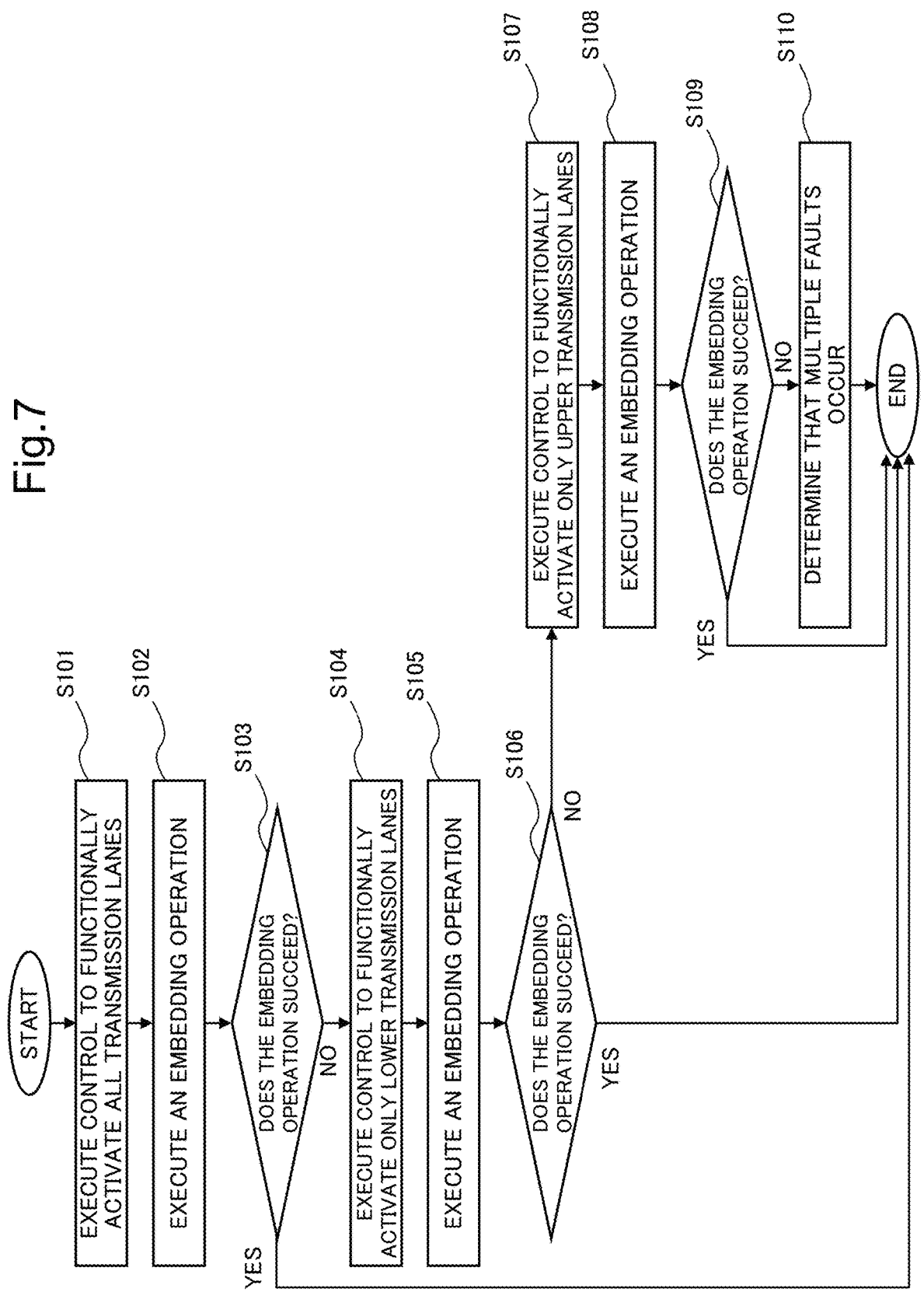
FIG. 7 is a flowchart illustrating a flow of processing in the fault tolerant apparatus according to the first example embodiment.

Processing after functionally separation of any of the above-mentioned subsystems in the fault tolerant apparatus 300 will be described in detail with reference to FIG. 7. FIG. 7 is a flowchart illustrating a flow of the processing in the fault tolerant apparatus 300 according to the first example embodiment. The processing is executed in the fault tolerant apparatus 300 in a state where any of the above-mentioned subsystems is functionally separated. For example, when a fault occurs in the fault tolerant apparatus 300, the embedder 140 functionally separates any of the above-mentioned subsystems.

The controller 123 executes control to functionally activate all the transmission lanes (the first transmission lane to the eighth transmission lane) (step S101). In this case, the controller 123 enables the first transmission lane to the eighth transmission lane to communicate (input and output) (or controls them to be communicable state).

The embedder 140 functionally embeds the module 1 and the module 2 into the fault tolerant apparatus 300 in order to realize a multiplexing (for example, duplicate) state using the modules (step S102). The embedding operation is, for example, processing for functionally embedding the modules into the fault tolerant apparatus 300 by copying data stored in memory connected with one processor into another memory connected with the other processor.

When a fault factor is in the module 1 and the module 1 is replaced, the embedder 140 is successful in the embedding operation. When a fault factor is in the module 2 and the module 1 is replaced, the embedder 140 fails in the embedding operation.

The controller 123 determines whether or not the embedding operation succeeds (step S103). If the embedding operation is in failure (NO in step S103), the controller 123 executes control to functionally activate only the lower transmission lanes in the transmission lanes 30 (step S104). In step S104, the controller 123 executes control to functionally activate the second transmission lane, the fourth transmission lane, the sixth transmission lanes and the eighth transmission lane. Then, the embedder 140 executes an embedding operation (embedding operations) (step S105). The controller 123 determines whether or not the embedding operation succeeds (step S106).

If a fault factor is in an upper transmission lanes at a side connected with the module 2, the controller 123 determines that the embedding operation succeeds since processing in step S104 is control to functionally activate only the lower transmission lanes. In this case, a multiplexing (for example, duplicate) state using the module 1, the module 2, and the transmission lanes 30 is realized in the fault tolerant apparatus 300. If a fault factor is in the lower transmission lanes at the side connected with the module 2, the controller 123 determines that the embedding operation is in failure in step S106, since processing in step S104 is control to functionally activate only the lower transmission lanes.

If the embedding operation is in failure (NO in step S106), the controller 123 executes control to functionally activate only the upper transmission lanes in the transmission lanes 30 (step S107). Then, the embedder 140 executes an embedding operation (embedding operations, embedding processing) (step S108). The controller 123 determines whether or not the embedding operation succeeds (step S109).

If a fault factor is in a transmission lanes connected with the module 2 in the lower transmission lanes, the controller 123 determines that the embedding operation succeeds in step S109.

In the case of NO in step S109, the controller 123 determines that a plurality of the fault factors occur in the fault tolerant apparatus 300 (i.e. multiple faults occur) (step S110). Even though control to functionally activate all the transmission lanes, control to functionally activate only the upper transmission lanes, or control to functionally activate only the lower transmission lanes is executed, the embedding operation fails.

It is assumes that one module is replaced with a normally running module in the fault tolerant apparatus 300. If the embedding operation succeeds either when control to functionally activate only the lower transmission lanes is executed, or when control to functionally activate only the upper transmission lanes is executed, a fault factor is in the transmission lanes 30 connected with a module at an opposite side of a replaced module. In such case, the module at the opposite side is replaced. After that, the fault tolerant apparatus 300 executes an embedding operation (embedding operations) with the module 1 and the module 2.

The processing illustrated in FIG. 7 is also executed in the module 2.

Figure 8:
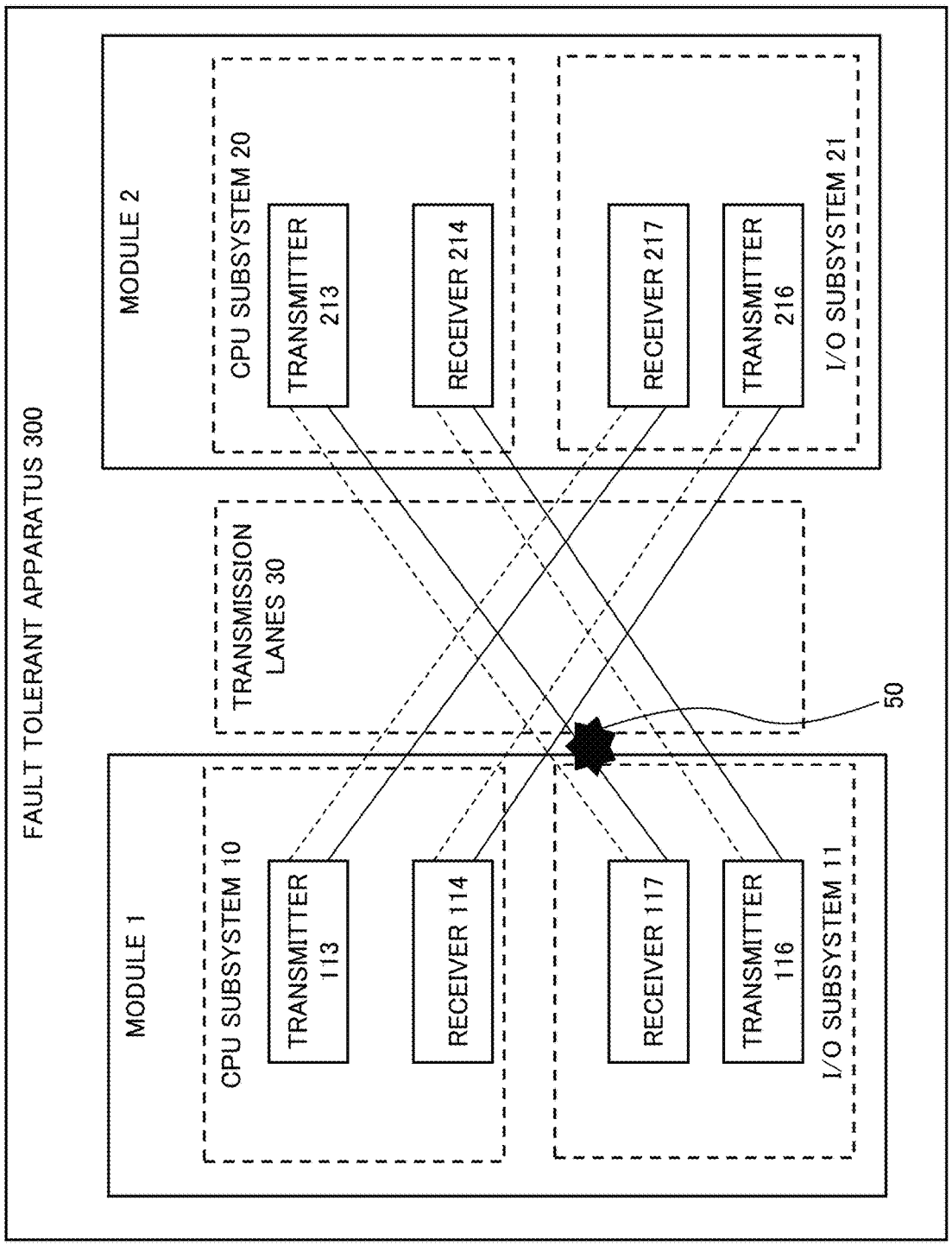
FIG. 8 is a figure conceptually illustrating a state occurred by a control to functionally active only lower transmission lanes out of the transmission lanes.

A state after control to be functionally activate only the lower transmission lanes in the transmission lanes 30 is described with reference to FIG. 8. FIG. 8 is a figure conceptually illustrating a state occurred by a control to functionally activate only the lower transmission lanes out of the transmission lanes 30. As shown by solid lines in FIG. 8, the fault tolerant apparatus 300 executes control to functionally activate the second transmission lane, the fourth transmission lane, the sixth transmission lanes and the eighth transmission lane in the transmission lanes 30. Dotted lines in FIG. 8 and FIG. 9 (described below) represent a functionally un-activated transmission lane. The example exemplified in FIG. 8 show that a fault 50 occurs at the side of the module 1 on the sixth transmission lane. When control to functionally activate only the lower transmission lanes is executed, the fault tolerant apparatus 300 fails in the embedding operation for the module 1 and the module 2 since the fault 50 occurs on the sixth transmission lane in the lower transmission lanes.

Figure 9:
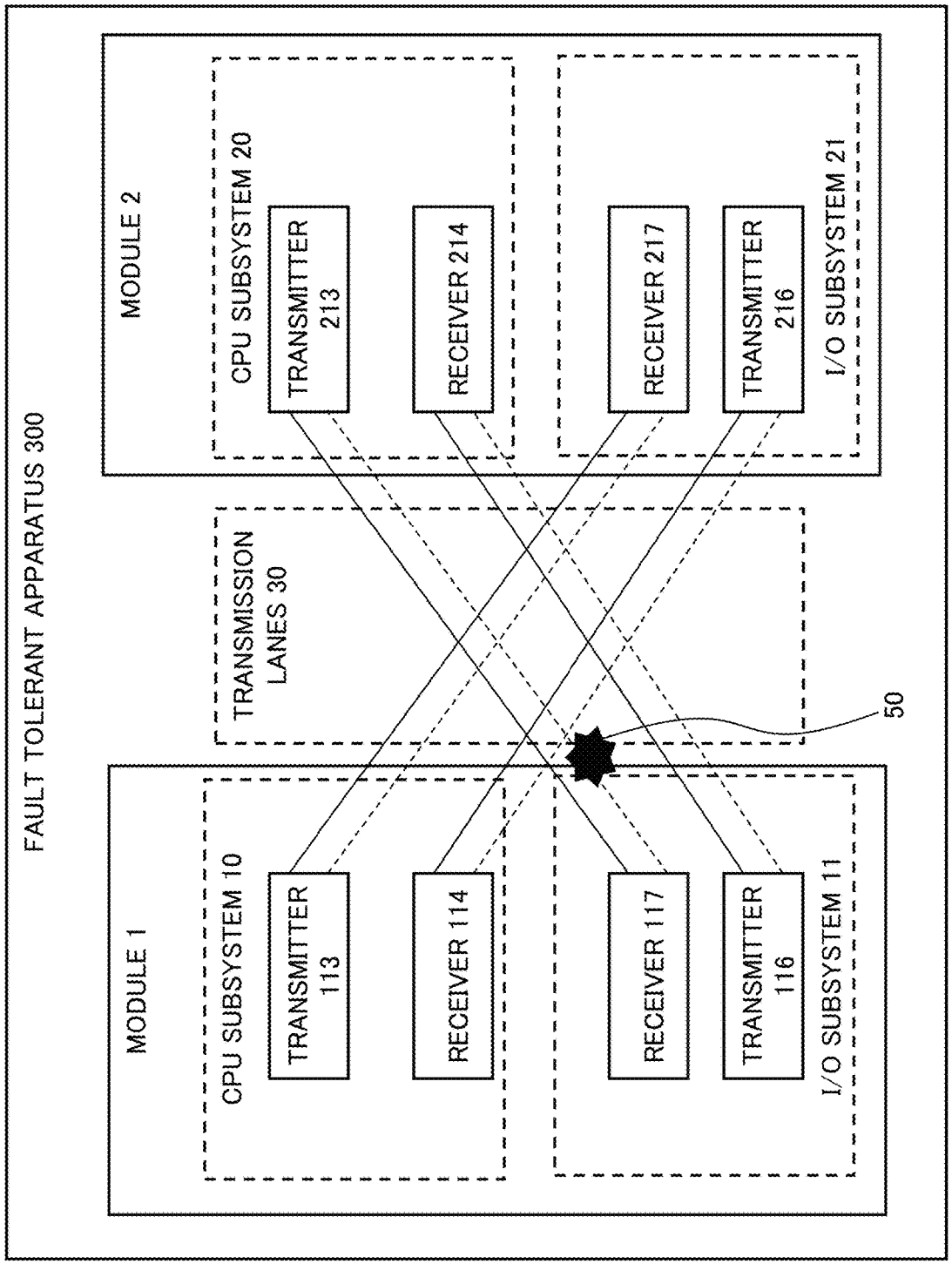
FIG. 9 is a figure conceptually illustrating a state occurred by a control to functionally active only upper transmission lanes out of the transmission lanes.

A state after control to functionally activate only the upper transmission lanes in the transmission lanes 30 is described with reference to FIG. 9. FIG. 9 is a figure conceptually illustrating a state occurred by a control to functionally activate only the upper transmission lanes out of the transmission lanes 30. In this example, the fault tolerant apparatus 300 executes control to functionally activate the first transmission lane, the third transmission lane, the fifth transmission lanes and the seventh transmission lane in the transmission lanes 30. The example shown in FIG. 9 illustrates that a fault 50 occurs at the side of the module 1 on the sixth transmission lane in the lower transmission lanes. The fault 50 occurs on the sixth transmission lane and, therefore, the embedding operation for the module 1 and the module 2 is successful in the fault tolerant apparatus 300 when control to functionally activate only the upper transmission lanes is executed.

An example of processing flows for realizing a multiplexing (for example, duplicate) state with the module 1 and the module 2 in the fault tolerant apparatus 300 when each transmission lane has a transmission lanes A and a transmission lanes B will be described with reference to FIG. 10. FIG. 10 is a figure conceptually illustrating an example of processing flows for realizing a duplicated state with two modules (module 1 and module 2) in the fault tolerant apparatus 300. For the convenience of explanation, it is assumed that the module 1 is replaced with a normally running module in the fault tolerant apparatus 300.

Each of the transmission lanes A and the transmission lanes B include a plurality of transmission lanes. For example, the transmission lanes A are upper transmission lanes as described above with reference to FIG. 1 and the like, and the transmission lanes B are the lower transmission lanes.

The controller 123 executes control to functionally activate both the transmission lanes A and the transmission lanes B (sequence 1). The embedder 140 executes an embedding operation (embedding operations) for the module 1 and the module 2. If the embedding operation succeeds, a duplicated state with the module 1 and the module 2 is realized in the fault tolerant apparatus 300. If the embedding operation fails, the controller 123 executes control to functionally activate only the transmission lanes A (sequence 2). The embedder 140 executes an embedding operation (embedding operations) for the module 1 and the module 2. If the embedding operation succeeds, a duplicated state with the module 1, the module 2, and the transmission lanes 30 is realized in the fault tolerant apparatus 300. If the embedding operation fails, the controller 123 executes control to functionally activate only the transmission lanes B (sequence 3).

The embedder 140 executes an embedding operation (embedding operations) for the module 1 and the module 2. If the embedding operation succeeds, the controller 123 realizes a duplicated state with the module 1, the module 2, and the transmission lanes 30 in the fault tolerant apparatus 300. If the embedding operation fails, the controller 123 determines that a plurality of fault factors occur.

Therefore, if the embedding operation succeeds, a duplicated state with the module 1 and the module 2 is realized in the fault tolerant apparatus 300.

The processing illustrated in FIG. 10 is also executed in the module 2.

An example of processing flows of realizing a multiplexing (for example, duplicate) state with two modules (module 1 and module 2) in the fault tolerant apparatus 300 when transmission lanes includes a transmission lanes A, a transmission lanes B, a transmission lanes C, and a transmission lanes D will be described with reference to FIG. 11. FIG. 11 is a figure conceptually illustrating an example of processing flows of realizing a duplicated state with two modules (module 1 and module 2). For the convenience of explanation, it is assumes that the module 1 is replaced with a normally running module in the fault tolerant apparatus 300.

The transmission lanes A, the transmission lanes B, the transmission lanes C, and the transmission lanes D include a plurality of transmission lanes, respectively. A transmitter (e.g. transmitter 113) is connected with a receiver (e.g. receiver 217) via a transmission lane in the transmission lanes A, a transmission lane in the transmission lanes B, a transmission lane in the transmission lanes C, and a transmission lane in the transmission lanes D. In this example, the upper transmission lanes includes the transmission lanes A and the transmission lanes B. The lower transmission lanes includes the transmission lanes C and the transmission lanes D.

The controller 123 executes control to functionally activate the transmission lanes A, the transmission lanes B, the transmission lanes C, and the transmission lanes D (sequence 1). The embedder 140 executes an embedding operation (embedding operations) for the module 1 and the module 2. If the embedding operation succeeds, a duplicated state with the module 1 and the module 2 is realized in the fault tolerant apparatus 300. If the embedding operation fails, the controller 123 executes control to functionally activate only the transmission lanes A and the transmission lanes B (sequence 2). The embedder 140 executes an embedding operation (embedding operations) for the module 1 and the module 2. If the embedding operation succeeds, a duplicated state with the module 1, and the module 2 is realized in the fault tolerant apparatus 300. If the embedding operation fails, the controller 123 executes control to functionally activate only the transmission lanes C and the transmission lanes D (sequence 3). The embedder 140 executes an embedding operation (embedding operations) for the module 1 and the module 2. If the embedding operation succeeds, a duplicated state with the module 1 and the module 2 is realized in the fault tolerant apparatus 300. If the embedding operation fails, the controller 123 determines that a plurality of fault factors occur.

The processing illustrated in FIG. 11 is also executed on the module 2. A part of the processing illustrated in FIG. 11 may be executed The processing illustrated in FIG. 11 is also executed in the module 2.

An example of processing flows for realizing a multiplexing (for example, duplicate) state with the module 1 and the module 2 when transmission lanes includes the transmission lanes A, the transmission lanes B, the transmission lanes C, and the transmission lanes D will be described with reference to FIG. 12. FIG. 12 is a figure conceptually illustrating an example of the processing flows for realizing a duplicated state using two modules (module 1 and module 2).

The transmission lanes A, the transmission lanes B, the transmission lanes C, and the transmission lanes D are a plurality of transmission lanes respectively. In this case, a transmitter (e.g. transmitter 113) is connected with a receiver (e.g. receiver 217) via a transmission lane in the transmission lanes A, a transmission lane in the transmission lanes B, a transmission lane in the transmission lanes C, and a transmission lane in the transmission lanes D. In the example, the upper transmission lanes include the transmission lanes A and the transmission lanes B. The lower transmission lanes include the transmission lanes C and the transmission lanes D.

The controller 123 executes control to functionally activate the transmission lanes A, the transmission lanes B, the transmission lanes C, and the transmission lanes D (sequence 1). The embedder 140 executes an embedding operation (embedding operations) for the module 1 and the module 2. If the embedding operation succeeds, a duplicated state with the module 1 and the module 2 is realized in the fault tolerant apparatus 300. If the embedding operation fails, the controller 123 executes control to functionally activate only the transmission lanes A and the transmission lanes B (sequence 2). The embedder 140 executes an embedding operation (embedding operations) for the module 1 and the module 2. If the embedding operation succeeds, a duplicated state with the module 1, and the module 2 is realized in the fault tolerant apparatus 300. If the embedding operation fails, the controller 123 executes control to functionally activate only the transmission lanes C and the transmission lanes D (sequence 3). The embedder 140 executes an embedding operation (embedding operations) for the module 1 and the module 2. If the embedding operation succeeds, a duplicated state with the module 1 and the module 2 is realized in the fault tolerant apparatus 300.

If the embedding operation fails, the controller 123 executes control to functionally activate only the transmission lanes A and the transmission lanes C (sequence 4). The embedder 140 executes the embedding operation (embedding operations) for the module 1 and the module 2. If the embedding operation succeeds, a duplicated state with the module 1 and the module 2 is realized in the fault tolerant apparatus 300. If the embedding operation fails, the controller 123 executes control to functionally activate only the transmission lanes A and the transmission lanes D (sequence 5). The embedder 140 executes an embedding operation (embedding operations) for the module 1 and the module 2. If the embedding operation succeeds, a duplicated state with the module 1 and the module 2 is realized in the fault tolerant apparatus 300.

If the embedding operation fails, the controller 123 executes control to functionally activate only the transmission lanes B and the transmission lanes C (sequence 6). The embedder 140 executes an embedding operation (embedding operations) for the module 1 and the module 2. If the embedding operation succeeds, a duplicated state with the module 1 and the module 2 is realized in the fault tolerant apparatus 300. If the embedding operation fails, the controller 123 executes control to functionally activate only the transmission lanes B and the transmission lanes D (sequence 7). The embedder 140 executes an embedding operation (embedding operations) with the module 1 and the module 2. If the embedding operation succeeds, a duplicated state with the module 1 and the module 2 is realized in the fault tolerant apparatus 300. If the embedding operation fails, the controller 123 determines that a plurality of fault factors occur.

The processing illustrated in FIG. 12 is also executed in the module 2. A part of the processing illustrated in FIG. 12 may be executed.

In the examples of the processing illustrated in FIG. 10 to FIG. 12, the function of the fault tolerant apparatus 300 is realized by selecting a successful combination for realizing a multiplexing (for example, duplicate) state from predetermined combinations of at least a part of transmission lanes in the transmission lanes 30.

Subsequently, advantages on the fault tolerant apparatus 300 according to the first example embodiment of the present invention will be explained.

The fault tolerant apparatus 300 according to the first example can realize high availability. This reason is that, when a fail happens at a part of transmission lanes in the fault tolerant apparatus 300, where two CPU subsystems run based on a lock-step method, recovery of a multiplexing (for example, duplicate) state is possible by using transmission lanes without a fail.

Second Example Embodiment

Next, a second example embodiment of the present invention based on the above-described first example embodiment will be described.

In the following description, characteristic parts of the present example embodiment will be mainly described, and the same components as in the above-described first example embodiment are assigned with the same reference signs, whereby overlapping description will be omitted.

Figure 13:
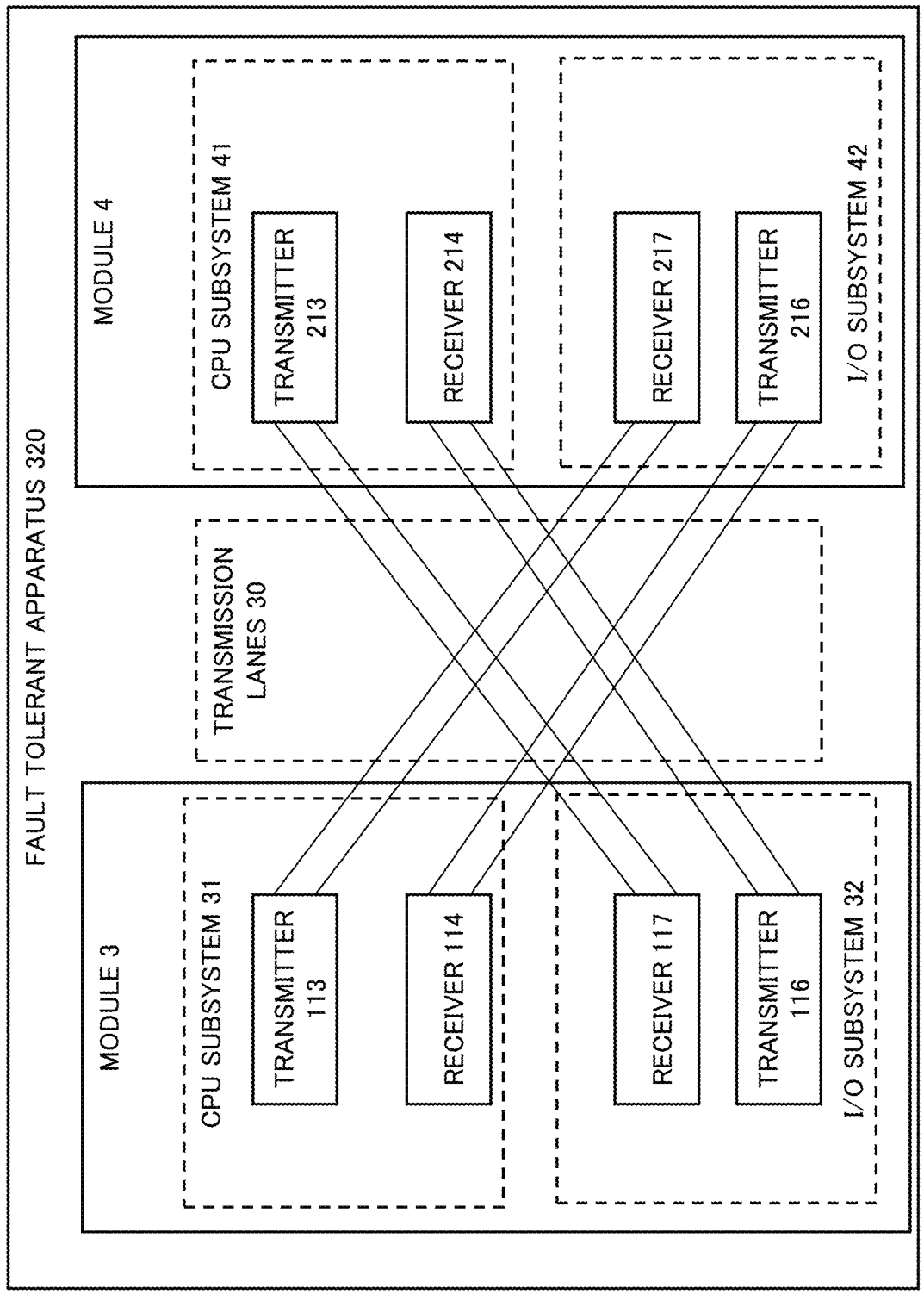
FIG. 13 is a block diagram roughly illustrating a functional configuration of a fault tolerant apparatus according to a second example embodiment of the present invention.

A configuration of a fault tolerant apparatus 320 according to a second example embodiment of the present invention will be described in detail with reference to FIG. 13. FIG. 13 is a block diagram roughly illustrating a functional configuration of the fault tolerant apparatus 320 according to the second example embodiment of the present invention.

The fault tolerant apparatus 320 according to the second example embodiment includes a module 3, a module 4, and transmission lanes 30. The transmission lanes 30 connect the module 3 and the module 4. The transmission lanes 30 include a plurality of transmission lanes.

As explained with reference to FIG. 11 or FIG. 12, it is assumed that transmission lanes connecting each transmitter with each receiver include transmission lanes A, transmission lanes B, transmission lanes C, and transmission lanes D. It is assumed that upper transmission lanes include the transmission lanes A, the transmission lanes B. It is assumed that lower transmission lanes includes the transmission lanes C, the transmission lanes D. The transmission lanes A to the transmission lanes D include a plurality of transmission lanes, respectively.

Figure 14:
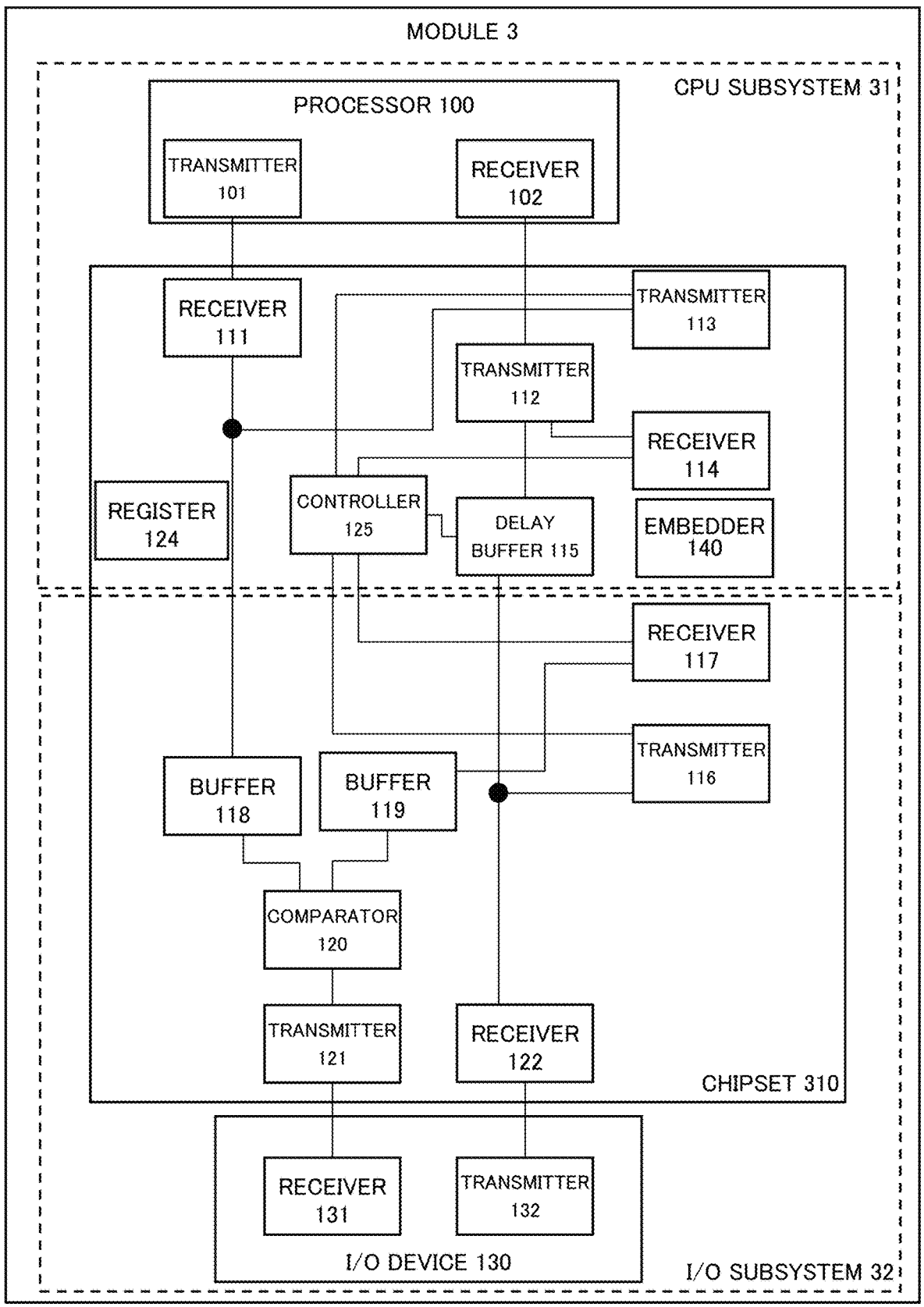
FIG. 14 is a block diagram illustrating a configuration of a module 3 according to the second example embodiment.

A configuration of the module 3 in the fault tolerant apparatus 320, which is simply illustrated in FIG. 13, will be described in detail with reference to FIG. 14. FIG. 14 is a block diagram illustrating a configuration of the module 3 according to the second example embodiment. The module 4 has a configuration similar to the module 3 in the fault tolerant apparatus 320 where two CPU subsystems run based on the lock-step method. Therefore, descriptions about the configuration of the module 4 will be omitted.

The module 3 includes a processor 100, a chipset 310, an I/O device 130. The chipset 310 includes a receiver 111, a transmitter 112, a transmitter 113, a receiver 114, a delay buffer 115, a transmitter 116, a receiver 117, a buffer 118, a buffer 119, a comparator 120, a transmitter 121, a receiver 122, a register 124, a controller 125, and an embedder 140.

The controller 125 reads control information representing the processing as described above with reference to FIG. 11 or FIG. 12 from the register 124 in order, and executes control to functionally activate the transmission lanes in accordance with the read control information. The register 124 may store the control information representing transmission lanes to be functionally activated.

Figure 15:
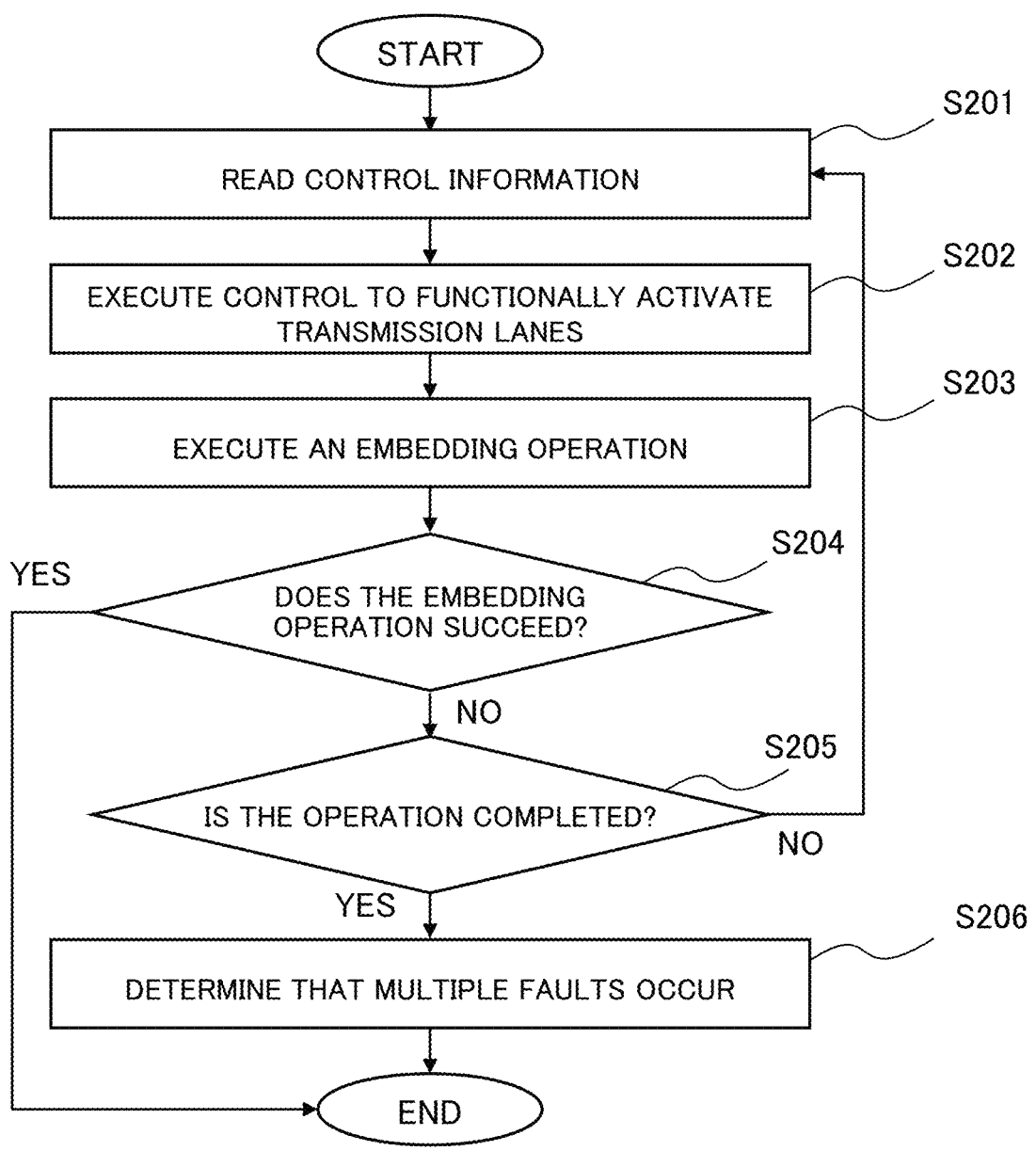
FIG. 15 is a flowchart illustrating a flow of processing in the fault tolerant apparatus according to the second example embodiment.

Processing in the fault tolerant apparatus 320 after functional separation of at least one of above-mentioned subsystems will be described in detail with reference to FIG. 15. FIG. 15 is a flowchart illustrating a flow of processing in the fault tolerant apparatus 320 according to the second example embodiment after functional separation of at least one of above-mentioned subsystems.

The controller 125 reads control information stored in the register 124 (e.g. control information in accordance with one order in FIG. 11 or FIG. 12) (step S201), and executes control to functionally activate the transmission lanes in accordance with the read control information (step S202). The embedder 140 executes an embedding operation (embedding operations) for the module 3 and the module 4 (step S203). The controller 125 determines whether or not the embedding operation succeeds (step S204).

If the embedding operation succeeds (YES in step S204), a multiplexing (for example, duplicate) state with the module 3, and the module 4 is realized in the fault tolerant apparatus 320. If the embedding operation fails (NO in step S204), the controller 125 determines whether or not the processing executed in accordance with the control information exemplified in FIG. 12 or FIG. 13 is completed (step S205). If the processing is not completed (NO in step S205), the processing in step S201 is executed. When YES in step S205, a duplicated state with the module 3 and the module 4 cannot be realized in the fault tolerant apparatus 320. In this case, the controller 125 determines that the fault is multiple faults caused by a plurality of factors (step S206).

For example, with respect to the control information illustrated in FIG. 11, the controller 125 executes control to functionally activate all the transmission lanes included in the transmission lanes 30 (transmission lanes A to transmission lanes D) (sequence 1). If the embedding operation based on the control information fails, the controller 125 executes control to functionally activate the upper transmission lanes (transmission lanes A and transmission lanes B) in the transmission lanes 30 (sequence 2). If the embedding operation based on the control information fails, the controller 125 executes control to functionally activate the lower transmission lanes (transmission lanes C and transmission lanes D) in the transmission lanes 30 (sequence 3).

If a fault occurs in either the upper transmission lanes or the lower transmission lanes in the transmission lanes 30, the fault tolerant apparatus 320 runs in accordance with the control information exemplified in FIG. 11 to realize a multiplexing (for example, duplicate) state with the module 3 and the module 4.

For example, with respect to the control information illustrated in FIG. 12, the controller 125 executes control to functionally activate all the transmission lanes included in the transmission lanes 30 (transmission lanes A to transmission lanes D) (sequence 1). If the embedding operation based on the control information fails, the controller 125 executes control to functionally activate the upper transmission lanes (transmission lanes A and transmission lanes B) in the transmission lanes 30 (sequence 2). The processing as described above with reference to FIG. 12 follows.

In accordance with the processing in FIG. 12, even though faults occur in both the upper transmission lanes and the lower transmission lanes, a duplicated state using the module 3 and the module 4 is realized in the fault tolerant apparatus 320 if the fault occurs in a part of the transmission lanes. For example, a state in which faults occur in the transmission lanes B and the transmission lanes C represents a state in which faults occur in both the upper transmission lanes and the lower transmission lanes. In this case, although a duplicated state cannot be realized in the fault tolerant apparatus 320 in accordance with the processing shown in FIG. 11, a duplicated state can be realized in the fault tolerant apparatus 320 in accordance with the processing shown in FIG. 12.

In the processing illustrated in FIG. 11 and FIG. 12, control to functionally activate all the transmission lanes in the transmission lanes 30 is executed. If the embedding operation based on the illustrated processing fails, control to functionally activate a part of the transmission lanes is executed. Since whether or not the embedding operation succeeds when all the transmission lanes are activated is determined with the highest priority. Therefore, the processing can achieve the maximum bandwidth of transmission lanes with high frequency.

The processing illustrated in FIG. 11 or FIG. 12 can achieve a broader transmission-lane bandwidth by processing in descending order of the number of the transmission lanes which are controlled to be functionally activated. This is because a configuration, that is successful at embedding operation, with broader transmission-lane bandwidth can be determined by trying the embedding operation in descending order of broadness of the transmission-lane bandwidth.

Subsequently, advantages on the fault tolerant apparatus 320 according to the second example embodiment of the present invention will be explained.

The fault tolerant apparatus 320 according to the second example embodiment can realize high availability. This reason is similar to the reason described in the first example embodiment.

Additionally, the fault tolerant apparatus 320 according to the second example embodiment can realize further high availability. This reason is similar to the above reason described with reference to FIG. 11 or FIG. 12.

Third Example Embodiment

Next, a third example embodiment of the present invention will be described.

Figure 16:
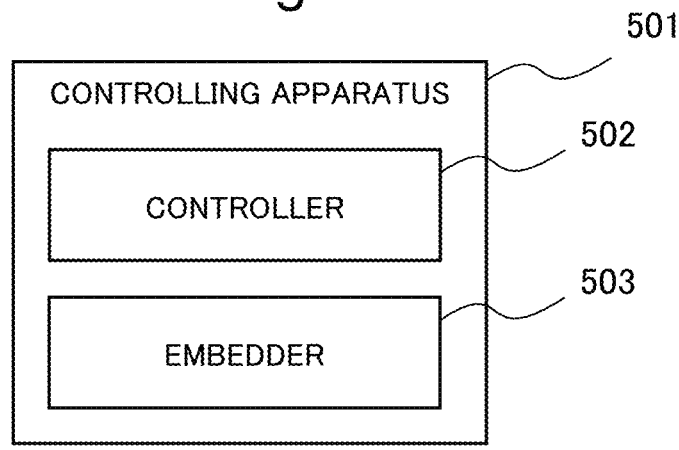
FIG. 16 is a block diagram illustrating a configuration of a controlling device according to a third example embodiment.

A configuration of a controlling device 501 according to a third example embodiment of the present invention will be described in detail with reference to FIG. 16. FIG. 16 is a block diagram illustrating a configuration of the controlling device 501 according to the third example embodiment of the present invention.

The controlling device 501 according to the third example embodiment includes a controller 502 and an embedder 503.

The controlling device 501 runs in a lock-step fault tolerant apparatus. The controlling device 501 controls processing via a plurality of transmission lanes which connect a plurality of subsystems in the fault tolerant apparatus 300 illustrated in FIG. 1 or the fault tolerant apparatus 320 illustrated in FIG. 13.

Figure 17:
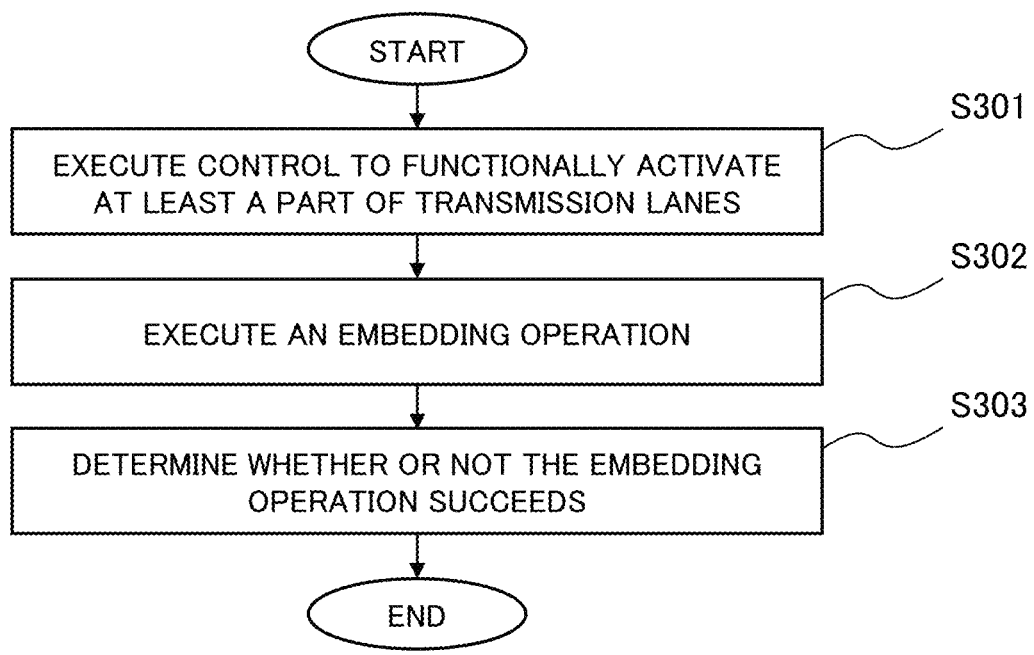
FIG. 17 is a flowchart illustrating a flow of processing in the controlling device according to the third example embodiment.

Processing of the controlling device 501 according to a third example embodiment of the present invention will be described in detail with reference to FIG. 17. FIG. 17 is a flowchart illustrating a flow of processing in the controlling device 501 according to the third example embodiment.

The controlling device 501 executes control to functionally activate at least a part of a plurality of transmission lanes (step S301).

The embedder 503 executes an embedding operation (embedding operations) which realizes a multiplexing (for example, duplicate) state with the transmission lanes to be functionally activated and the subsystems by the controlling device 501 (step S302).

The controller 502 determines whether or not the embedding operation succeeds (step S303).

If the embedding operation succeeds, processing illustrated in step S301 and step S302 can realize a duplicated state with the transmission lanes to be functionally activated and the subsystems by the controlling device 501. If the embedding operation fails, the controlling device 501 may repeatedly execute the processing illustrated in FIG. 17 by executing control to functionally activate a transmission lane different from the transmission lanes controlled in step S301.

The controller 502 can be realized by functions similar to those of the controller 123 according to the first example embodiment or the controller 125 according to the second example embodiment. The embedder 503 can be realized by functions similar to those of the embedder 140 according to the first example embodiment or those of the embedder 140 according to the second example embodiment. Therefore, the controlling device 501 can be realized by functions similar to those of the module 1 and the module 2 according to the first example embodiment, or those of the module 3 or the module 4 according to the second example embodiment.

Subsequently, advantages on the controlling device 501 according to the third example embodiment of the present invention will be explained.

The controlling device 501 according to the third example embodiment can realize high availability for a fault tolerant apparatus. This reason is that, when a fail happens at a part of transmission lanes, a multiplexing (for example, duplicate) state with another part of the transmission lanes and a subsystem can be realized.

In each above-described example embodiment, processing of a fault tolerant apparatus has been described with reference to examples where the fault tolerant apparatus realizes a duplicated state. However, the fault tolerant may include more redundancy. In this case, the fault tolerant apparatus execute processing as described above in each example embodiment to realize functions similar to each fault tolerant apparatus. In other word, the fault tolerant apparatus according to the present invention can realize not only a duplicated state but also a multiplexing state.

The present invention has been described using the above-described example embodiments as exemplary cases. However, the present invention is not limited to the above-described example embodiments. In other words, the present invention is applicable with various aspects that can be understood by those skilled in the art without departing from the scope of the present invention.

REFERENCE SIGNS LIST

1 Module
2 Module
10 CPU subsystem
20 CPU subsystem
11 I/O subsystem
21 I/O subsystem 30 Transmission lanes
300 Fault tolerant apparatus
100 Processor
101 Transmitter
102 Receiver
110 Chipset
111 Receiver
112 Transmitter
113 Transmitter
114 Receiver
115 Delay buffer
140 Embedder
123 Controller
116 Transmitter
117 Receiver
118 Buffer
119 Buffer
120 Comparator
121 Transmitter
122 Receiver
130 I/O device
131 Receiver
132 Transmitter
200 Processor
210 Chipset
213 Transmitter
214 Receiver
215 Delay buffer
223 Controller
216 Transmitter
217 Receiver
230 I/O device
3 Module
4 Module
320 Fault tolerant apparatus
124 Register
125 Controller
310 Chipset
501 Controlling device
502 Controller

The invention claimed is:

1. A controlling device comprising:
a controller configured to execute control to functionally activate, at least, a part of transmission lanes in multiple transmission lanes connecting a plurality of subsystems which run based on a lock-step method; and
an embedder configured to execute an embedding operation to realize a multiplexing state using the part of transmission lanes controlled to functionally activate by the controller and the plurality of the subsystems, wherein,
the controller determines whether or not the embedding operation succeeds, determines, when the embedding operation fails, whether or not an additional embedding operation using another part of transmission lanes, of the multiple transmission lanes, different from the part of transmission lanes used in the failure embedding operation succeeds, and executes, when the additional embedding operation succeeds, control to functionally activate the other part of transmission lanes.

2. The controlling device according to claim 1, wherein the controller executes control to functionally activate transmission lanes included in a combination of transmission lanes used in successful embedding operation in a plurality of predetermined combinations of, at least, a part of the multiple transmission lanes.

3. The controlling device according to claim 2, wherein the controller determines whether or not the embedding operation and the additional embedding operation succeed in descending order of a number of the transmission lanes including the plurality of the predetermined combinations.

4. The controlling device according to claim 1, wherein the controller selects two transmission lanes of the multiple transmission lanes, determines whether or not the embedding operation or the additional embedding operation with the selected two transmission lanes succeeds, and executes, when the embedding operation succeeds, control to functionally activate the selected two transmission lanes.

5. The controlling device according to claim 1, wherein the controller determines whether or not an embedding operation using all of the multiple transmission lanes succeeds, executes, when the embedding operation succeeds, control to functionally activate all of the multiple transmission lanes, determines, when the embedding operation fails, whether or not an additional embedding operation using a part of transmission lanes of the multiple transmission lanes succeeds, and executes, when the additional embedding operation succeeds, control to functionally activate the part of transmission lanes.

6. A fault tolerant apparatus comprising:
a controlling device according to claim 1; and
a plurality of subsystems, wherein,
each subsystem in the plurality of the subsystems includes:
a transmitter configured to transmit data to another subsystem in the plurality of the subsystems,
a receiver configured to receive the data transmitted by the other subsystem,
an input/output device configured to execute input/output processing,
a processor configured to generate data for the input/output device, and
a comparator configured to determine whether or not the data generated by the processor and the data received by the receiver match and output, when the generated and the received data match, the received data to the input/output device, wherein,
the transmitter transmits the data generated by the processor to the other subsystem via transmission lanes.

7. A controlling method comprising: by an information processing apparatus,
executing control to functionally activate of, at least, a part of transmission lanes in multiple transmission lanes connecting a plurality of subsystems which run based on a lock-step method; and
executing an embedding operation to realize a multiplexing state using the part of transmission lanes controlled to functionally activate, wherein,
determining whether or not the embedding operation succeeds,
determining, when the embedding operation fails, whether or not an additional embedding operation using another part of transmission lanes, of the multiple transmission lanes, different from the part of transmission lanes used in the failure embedding operation succeeds, and
executing, when the additional embedding operation succeeds, control to functionally activate the another part of transmission lanes.

8. The controlling method according to claim 7, further comprising:

executing control to functionally activate transmission lanes included in a combination of transmission lanes used in a successful embedding operation in a plurality of predetermined combinations of, at least, a part of the multiple transmission lanes.

9. The controlling method according to claim 8, further comprising:

determining whether or not the embedding operation and the additional embedding operation succeed in descending order of a number of the transmission lanes including the plurality of the predetermined combinations.

10. The controlling method according to claim 7, further comprising:

selecting two transmission lanes of the multiple transmission lanes, determining whether or not the embedding operation or the additional embedding operation with the selected two transmission lanes succeeds, and executing, when the embedding operation succeeds, control to functionally activate the selected two transmission lanes.

* * * * *